(12) United States Patent
Ulm

(10) Patent No.: US 8,949,278 B2
(45) Date of Patent: Feb. 3, 2015

(54) CONTACT INFORMATION MANAGEMENT

(75) Inventor: Joshua S. Ulm, San Rafael, CA (US)

(73) Assignee: Adobe Systems Incorporated, San Jose, CA (US)

(*) Notice: Subject to any disclaimer, the term of this patent is extended or adjusted under 35 U.S.C. 154(b) by 1808 days.

(21) Appl. No.: 12/038,480

(22) Filed: Feb. 27, 2008

(65) Prior Publication Data

US 2014/0304260 A1    Oct. 9, 2014

(51) Int. Cl.
*G06F 17/30* (2006.01)

(52) U.S. Cl.
CPC ............................. *G06F 17/30286* (2013.01)
USPC ......................................................... 707/802

(58) Field of Classification Search
CPC ................................................ G06F 17/30286
USPC ........................................ 707/802, 999.3, 705
See application file for complete search history.

(56) References Cited

U.S. PATENT DOCUMENTS

| | | | |
|---|---|---|---|
| 6,621,895 B1* | 9/2003 | Giese | 379/201.03 |
| 6,633,311 B1* | 10/2003 | Douvikas et al. | 715/731 |
| 7,100,116 B1* | 8/2006 | Shafrir et al. | 715/751 |
| 7,103,846 B1* | 9/2006 | Shafrir et al. | 715/751 |
| 7,143,356 B1* | 11/2006 | Shafrir et al. | 715/751 |
| 7,607,561 B2* | 10/2009 | Murayama et al. | 228/180.5 |
| 7,797,293 B2* | 9/2010 | Pabla et al. | 707/705 |
| 2001/0013050 A1* | 8/2001 | Shah | 709/202 |
| 2002/0035607 A1* | 3/2002 | Checkoway et al. | 709/206 |
| 2002/0120462 A1* | 8/2002 | Good | 705/1 |
| 2003/0050920 A1* | 3/2003 | Sun | 707/2 |
| 2003/0177274 A1* | 9/2003 | Sun | 709/310 |
| 2004/0073643 A1* | 4/2004 | Hayes et al. | 709/223 |
| 2005/0091272 A1* | 4/2005 | Smith et al. | 707/104.1 |
| 2005/0117733 A1* | 6/2005 | Widger et al. | 379/221.05 |
| 2005/0144291 A1* | 6/2005 | Frank et al. | 709/227 |
| 2005/0163108 A1* | 7/2005 | Moore et al. | 370/352 |
| 2005/0210104 A1* | 9/2005 | Torvinen | 709/205 |
| 2005/0251448 A1* | 11/2005 | Gropper | 705/14 |

(Continued)

OTHER PUBLICATIONS

McFadden, Ted, et al., "Applying a Disciplined Approach to the Development of a Context-Aware Communication Application", PerCom 2005, Kauai Island, HI, Mar. 8-12, 2005, pp. 300-306.*

(Continued)

*Primary Examiner* — Robert Stevens
(74) *Attorney, Agent, or Firm* — Kilpatrick Townsend & Stockton LLP

(57) ABSTRACT

Via a graphical user interface, a user can select multiple different services (e.g., remote repositories such as websites) having contact information associated with the user's contacts (e.g., friends, Internet buddies, friends of friends, acquaintances, etc.). Based on the selection of multiple services, the contact information manager communicates with the multiple services over a network to retrieve the contact information associated with the user's friends (i.e., contacts). The retrieved contact information can specify identities of the multiple contacts as well as different communication modes (e.g., phone, e-mail, addresses information, whereabouts information, etc.) for communicating with the user's contacts. The contact information manager processes the contact information from the multiple services and initiates display of the contact information in a unified listing. Accordingly, via the contact information manager, a user can more efficiently manage contact information obtained from multiple disparate locations over a network.

29 Claims, 11 Drawing Sheets

(56) References Cited

U.S. PATENT DOCUMENTS

| | | | |
|---|---|---|---|
| 2006/0036447 A1* | 2/2006 | Roever et al. | 705/1 |
| 2006/0052091 A1* | 3/2006 | Onyon et al. | 455/415 |
| 2006/0098583 A1* | 5/2006 | Baker et al. | 370/252 |
| 2006/0148512 A1* | 7/2006 | Ekholm et al. | 455/550.1 |
| 2006/0161554 A1* | 7/2006 | Lucovsky et al. | 707/10 |
| 2006/0168204 A1* | 7/2006 | Appelman et al. | 709/224 |
| 2006/0234762 A1* | 10/2006 | Ozluturk | 455/552.1 |
| 2008/0010257 A1* | 1/2008 | Tolfa et al. | 707/3 |
| 2008/0013712 A1* | 1/2008 | Gopinath | 379/218.01 |
| 2008/0046369 A1* | 2/2008 | Wood | 705/50 |
| 2008/0065514 A1* | 3/2008 | Eaton | 705/27 |
| 2008/0189399 A1* | 8/2008 | Quoc et al. | 709/223 |
| 2008/0208812 A1* | 8/2008 | Quoc et al. | 707/3 |
| 2008/0261569 A1* | 10/2008 | Britt et al. | 455/414.1 |
| 2008/0292080 A1* | 11/2008 | Quon et al. | 379/201.02 |
| 2008/0299953 A1* | 12/2008 | Rao | 455/414.1 |
| 2009/0100378 A1* | 4/2009 | Klassen et al. | 715/821 |
| 2009/0150373 A1* | 6/2009 | Davis et al. | 707/5 |
| 2009/0177695 A1* | 7/2009 | Mahajan et al. | 707/104.1 |
| 2009/0187831 A1* | 7/2009 | Tiwana et al. | 715/752 |

OTHER PUBLICATIONS

Kim, Jin Baek, et al., "A Web-Services-Enabled Marketplace Architecture for Negotiation Process Management", Decision Support Systems, vol. 40, Issue 1, Jul. 2005, pp. 71-87.*

Lakshmipathy, Vidya, et al., "SimPhony—A Voice Communication Tool for Distributed Workgroups", BT Technology Journal, vol. 22, No. 4, Oct. 2004, pp. 52-61.*

Nardi, Bonnie A., et al., "Integrating Communication and Information Through ContactMap", Communications f the ACM, vol. 45, No. 4, Apr. 2002, pp. 89-95.*

Whittaker, Steve, et al., "managing Long Term Communications: Conversation and Contact Management", Proc. of the 35th Hawaii International Conf. on System Sciences, IEEE, © 2002, pp. 1-10.*

* cited by examiner

CONTACT INFORMATION MANAGEMENT

RELATED APPLICATION

This application is related to U.S. patent application Ser. No. 12/038,506, filed on Feb. 27, 2008, now U.S. Pat. No. 8,745,481 entitled "AGGREGATING CONTENT FROM MULTIPLE SERVICES", filed on the same day as the present application, the entire teachings of which are incorporated herein in its entirety by this reference.

BACKGROUND

The web (e.g., internet) has dramatically changed over the past several years. It is now easier than ever for persons all around the world to communicate with each other and exchange personal information.

For example, social networking services are popular ways of enabling vast numbers of persons having similar interests to easily communicate with each other over. Such services are primarily web based and provide numerous ways for users to interact with each other. Modes of communicating can include online chatting, online messaging, emailing, video playback, voice chatting, file sharing, blogging, discussion groups, and so on.

Certain social networking services enable a user to maintain a directory of contacts so that, upon visiting the social networking website, the user can keep track of his or her friends at the particular service. Depending on the service, a directory can include identities of persons such as a group of former classmates, persons that are part of a club, chat room friends, etc.

In certain instances, a user needs a user name and password to log onto a social networking service. This prevents unauthorized persons from obtaining a directory of friends and, in theory, provides at least a level of security for the different users instructions of the social networking service. After authentication of a user by a service, the user can have access to their directory of friends.

In addition to maintaining and providing access to directories of friends, social networking services can be configured to enable each of the users of the service to create a corresponding user profile (e.g., a webpage of information) that is accessible by other users of the social networking service. In certain cases, a user profile can include contact information such as telephone number(s), e-mail address(es), etc. for contacting the user. Additionally, the profile can include playable content such as videos, music, links to content, etc.

Upon visiting a social networking service, a user can access his or her directory of friends as mentioned above. If desired, the user can view profile information associated with the persons listed in the directory of friends by retrieving an information page associated with the selected friend or friends. Based on profile information such as contact information associated with a respective social networking service subscriber, the user can initiate communications with the friends in the directory.

SUMMARY

Management of remotely located contact information such as information maintained by multiple conventional social networking services suffers from a variety of deficiencies. For example, currently there is no efficient way for a user to manage contact information at multiple different social networking services other than to manually (and separately) visit each site that maintains corresponding contact information and, if desired, manually retrieve the contact information and store it locally for further processing. As one may expect, management of contact information in this way can be very tedious.

Techniques discussed herein significantly overcome the deficiencies of conventional contact information management applications. For example, as will be discussed further, certain specific embodiments herein are directed to a computer and/or network environment in which a user manages his or her contact information via use of a contact information manager having access to multiple remote services. As will be discussed, the contact information manager simplifies contact information management so that a user can more easily manage contact information associated with his or her friends. The contact information can include any information associated with corresponding one or more contacts. By way of a non-limiting example, the contact information can include addresses, phone numbers, e-mail addresses, websites, etc.

More specifically, according to one embodiment, a contact information manager initiates display of a graphical user interface to a user. Via the graphical user interface, the user can select multiple different services having contact information associated with the user's contacts. By way of a non-limiting example, the contacts can include friends, Internet buddies, friends of friends, acquaintances, etc. Also, by way of a non-limiting example, the multiple different services can be remote repositories of contact information such as at social networking websites, contact information storage directories, etc.

Based on the selection of multiple services, the contact information manager according to embodiments herein communicates with the multiple services over a network to retrieve the contact information associated with the user's contacts. In one implementation, the retrieved contact information can specify identities of the multiple contacts and/or different communication modes such as phone, e-mail, addresses information, whereabouts information, etc., for communicating with the user's contacts.

On behalf of the user, the contact information manager processes the contact information from the multiple services. Processing can include sorting of the contact information and displaying the contact information in a unified listing so that the user can view the contacts and corresponding contact information in a single listing including contacts from different services. The unified listing can include display information indicating which of one or more services the different contacts in the unified list belong. The unified listing can therefore include multiple contacts including the user's contacts and corresponding contact information from multiple services. Recall that conventional techniques are limiting because the user must manually retrieve the contact information and view it in a listing of contacts from a single service only.

In one embodiment, the user can apply commands to the contacts in the unified listing. For example, in addition to retrieving identities of contacts, the contact information manager also retrieves contact information associated with the different contacts. The contact information manager stores the contact information associated with the contacts presented in the unified listing. In response to receiving a command to display contact information for a contact selected from the listing, the contact information manager initiates display of different communication modes such as an e-mail address, phone number, etc. for communicating with the selected contact. For example, the contact information manager can retrieve an e-mail address for a given contact from a first service and retrieve phone number information for the given contact from a second service, and so on.

In further embodiments, the contact information can include status information for a corresponding contact indicating a current availability of the contact. In accordance with the status information, for a respective contact in the unified listing, the contact information manager can provide an indication about the contact's current and/or future availability. This can include such information as that the contact is currently available, when the contact will be available at a later time, etc. In such an embodiment, the user need not manually visit every service to learn of a contact's availability status. The availability information can be displayed in the unified listing, and in certain embodiments, be displayed along with name information and a picture of the contact.

Based on these and other embodiments as further described herein, a user can more efficiently manage and use contact information obtained from multiple disparate locations over a network using the contact information manager.

In addition to the embodiments as discussed above, other embodiments herein can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include an aggregator and/or related functions as explained herein to carry out different embodiments of the invention.

Yet other embodiments herein include software programs to perform the steps and operations summarized above and disclosed in detail below. One such embodiment comprises a computer program product that has a computer-readable medium (e.g., a tangible computer readable media, disparately located or commonly located media) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes one or more computer readable media having instructions stored thereon for supporting operations such as management, retrieval, and display of contact information associated with a subscriber. The instructions, and thus method as described herein, when carried out by a processor of a respective computer device, cause the processor to: i) receive a selection of multiple services; ii) communicate with the multiple services over a network to retrieve contact information, the contact information specifying multiple contacts and different modes for communicating with the multiple contacts; and iii) initiate display of the contact information in a listing.

Another particular embodiment of the present disclosure is directed to a computer program product that includes a computer readable medium having instructions stored thereon for supporting operations such as distribution of contact information. Such instructions, and thus method as described herein, when carried out by a processor of a respective computer device, cause the processor to: i) initiating display of a graphical user interface; ii) receiving contact information associated with a subscriber to multiple services; iii) via the graphical user interface, receiving a command to update contact information associated with the subscriber; and iv) in response to receiving the command, initiating communication with the multiple services to transmit the received contact information for the subscriber to the multiple services. Other embodiments of the present disclosure include software programs to perform any of the method embodiment steps and operations summarized above and disclosed in detail below.

Of course, the numbering of the above steps has been added for clarity sake, these steps may not need to be performed in any particular order.

Also, it is to be understood that each of the systems, methods, and apparatuses herein can be embodied strictly as a software program, as a hybrid of software and hardware, or as hardware alone such as within a processor, or within an operating system or within a software application, or via a non-software application such a person performing all or part of the operations. Example embodiments of the invention may be implemented in products and/or software applications such as those manufactured by Adobe Systems Incorporated of San Jose, Calif., USA.

As discussed above, techniques herein are well suited for use in software applications supporting management of contact information. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a contact information manager initiates display of a graphical user interface to a user. Via the graphical user interface, the user can select multiple different services. The services maintain contact information associated with the user's contacts.

Based on selection of multiple services from which to retrieve contact information, the contact information manager communicates with the multiple services over a network to retrieve the contact information associated with the user's contacts. By way of a non-limiting example, the contacts can include any type of entity that can be contacted by the user. The retrieved contact information associated with the contacts can specify different types of information such as identities of the multiple contacts and/or different communication modes for communicating with the user's contacts. By way of a non-limiting example, the different communication modes can include phone, e-mail, addresses information, whereabouts information, etc. Via input to the graphical user interface, a respective user can perform different functions such as manage, view, distribute, modify, etc. the contact information.

Figure 1:
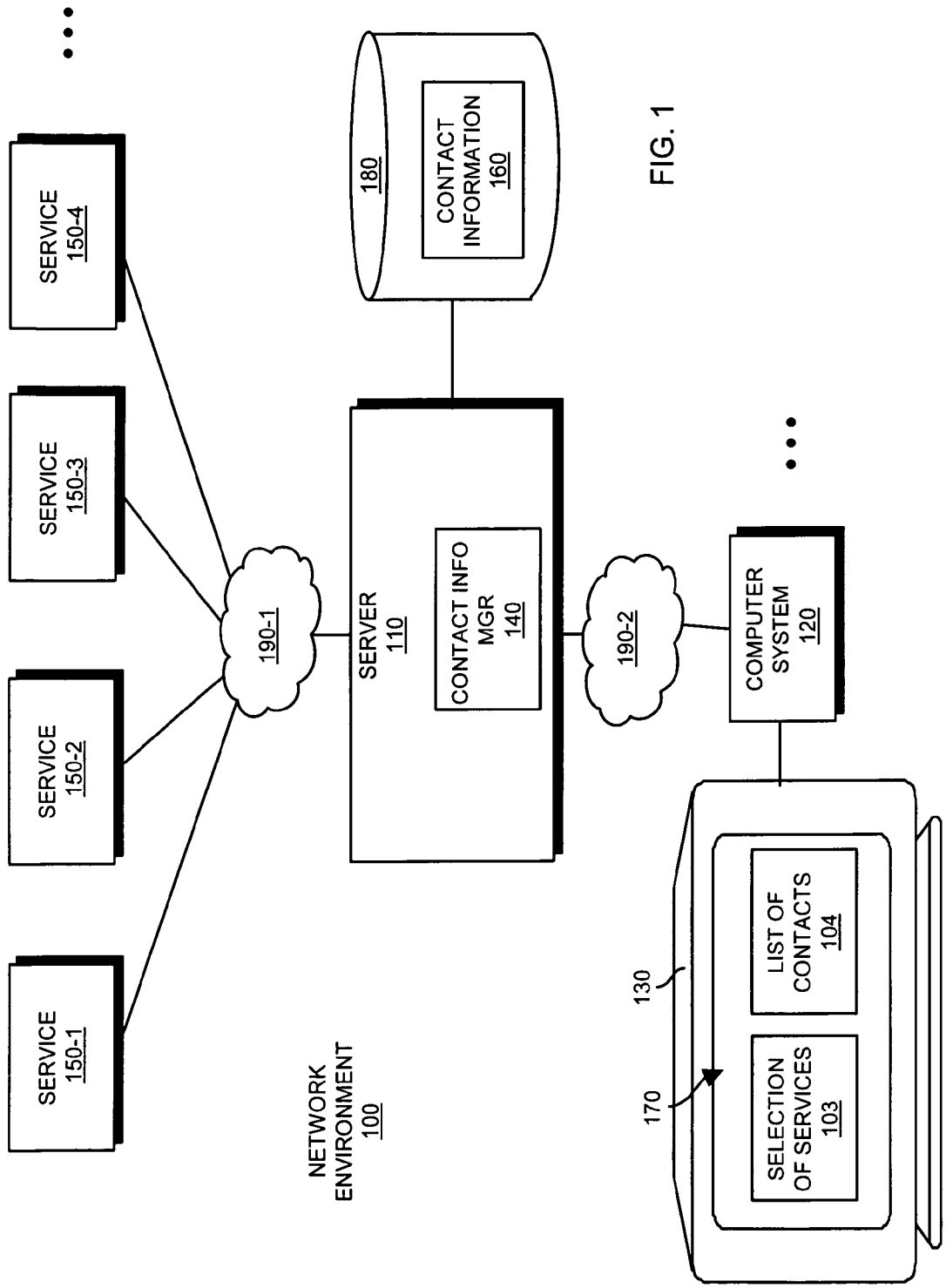
FIG. 1 is an example diagram of a contact information manager in a computer/network environment according to embodiments herein.

Now, more specifically, FIG. 1 is an example diagram illustrating a network environment 100 supporting management of contact information according to embodiments herein. As shown, network environment 100 includes display screen 130, computer system 120, network 190 (e.g., network 190-1 and network 190-2), server 110, repository 180, and services 150 (e.g., service 150-1, service 150-2, service 150-3, service 150-4, etc.). In accordance with input from a user, display screen 130 displays graphical user interface 160. Repository 180 stores contact information 170. Network 190-1 and network 190-2 can be the same network or different networks.

As previously discussed, certain specific embodiments herein are directed to a computer and/or network environment in which a contact information manager 140 aggregates contact information for a respective computer user. As will be discussed, the contact information manager simplifies contact information management so that a user can more easily collect and view contact information associated with his or her contacts.

For example, in accordance with user input, contact information manager 140 running on server 110 such as one or more servers, computers, etc., initiates display of a graphical user interface 160 to a user. This can require that a user at computer system 120 log on to or visit server 110 and initiate, via communications from the computer system to the server, activation of contact information manager 140. In such an embodiment, computer system 120 is a client interacting with server 110 although different types of communication models can be used in accordance with other embodiments herein.

Note that although contact information manager 140 is shown being executed in server 110, the contact information manager 140 can be configured to execute on different types of platforms such as directly on computer system 120 so that a client-server connection is not needed carry out management of contact information as described herein. When disposed in a respective server 110, the contact information manager can be configured to perform aggregation and other functions as described herein for a number of different users having corresponding computers coupled to network 190-2.

In addition to being able to access services 150 via issuance of commands to contact information manager 140, the user can alternatively access one or more of the services 150 via use of a corresponding browser running on computer system 120. In such circumstances, the user must manually access each service via use of an appropriate URL (Uniform Resource Locator). In other words, the user of computer system 120 can subscribe to one or more of the multiple services 150 and have corresponding contact information associated with himself/herself at the services. As a member of the services, the user will have access to contact information associated with friends at the services.

Embodiments herein and use of contact information manager 140 to aggregate and manage contact information at the services alleviates the user from having to individually access the services (according to conventional techniques) because the contact information manager 140 provides an appropriate interface to collect information from services on behalf of the user and display it in a user-friendly manner to the user.

For example, via the graphical user interface 160, the contact information manager 140 initiates display of the different possible services to which the user may (or does) subscribe. Management via the graphical user interface 160 can include the user at computer system 120 selecting from a listing 103 of multiple services displayed in the graphical user interface 170. As previously discussed, each of the services can maintain contact information associated with the user operating graphical user interface 160. Additionally, as previously discussed and by way of a non-limiting example, one or more of the services 150 can be social networking services (e.g., Facebook™, Myspace™, etc.) to which the user of computer system 120 and/or corresponding user subscribes.

Each of services 150 can maintain corresponding contact information associated with the user's contacts. By way of a non-limiting example, contacts can include any type of entity such as friends, Internet buddies, friends of friends, acquaintances, companies, etc. Also, by way of a non-limiting example, contact information for the contacts (as maintained by the services 150) can include, without limitation, work phone information, cell phone information, e-mail address information, instant messaging address information, links to personal information, picture(s), video, weblinks, music, etc. Typically, the contact information associated with the contacts is managed via the contacts themselves. For example, the contacts can access the corresponding services and update their contact information.

Based on the selection of multiple services from listing 103 displayed in graphical user interface 160 and issuance of a "collection" or "aggregation" command by user, the computer system 120 forwards the collection command and corresponding selection information to contact information manager 140 at server 110. In turn, the contact information manager 140 communicates with each of the services 150 specified by the user.

Note that in certain embodiments, the "collection" or "aggregation" command isn't necessarily a direct command input by a user, but is rather more of a passive, pre-set "scheduled" setting whereby the contact information manager 140 performs aggregation of contact information on a regular or random basis such as once a day, once a week, etc. Thus, in such embodiments when aggregation occurs repeatedly as a result of scheduling, the user can be apprised of the most up-to-date contact information without having to repeatedly issue "collection" or "aggregation" commands.

Such a scheduled setting can indicate the times in which the contact information manager 140 is to initiate communications with the multiple services. In accordance with the scheduled setting, the contact information manager 140 performs multiple scheduled collections of the contact information from the multiple services at different times so that the user can be apprised of the most up-to-date contact information.

By way of a non-limiting example, the user can configure the contact information manager 140, via schedule settings, to automatically collect or aggregate contact information from the services 150 on a scheduled basis. In other words, a user can create a schedule indicating when to perform collection of contact information. As an alternative non-limiting example, a source other than the user, such as a network administrator, scheduling policy, etc., can configure the contact information manager 140 to automatically perform a collection or aggregation of contact information from the services 150 on a scheduled basis.

In an example embodiment, based on selection of the services from listing 103, the contact information manager 140 communicates with each of the selected services via a corresponding application programming interface supported by the respective service. If necessary, the contact information manager 140 supplies a username and password associated with the user to access the respective services 150 in order to retrieve contact information. After authentication by the service 150 being accessed, the contact information manager 140 initiates further communications with the service to retrieve contact information.

Assume in this example that the user selects each of services 150-1, 150-2, 150-3, and 150-4 in listing 103 to retrieve respective contact information. The contact information manager 140 retrieves a corresponding contact list from each of these services as in FIG. 2.

Figure 2:
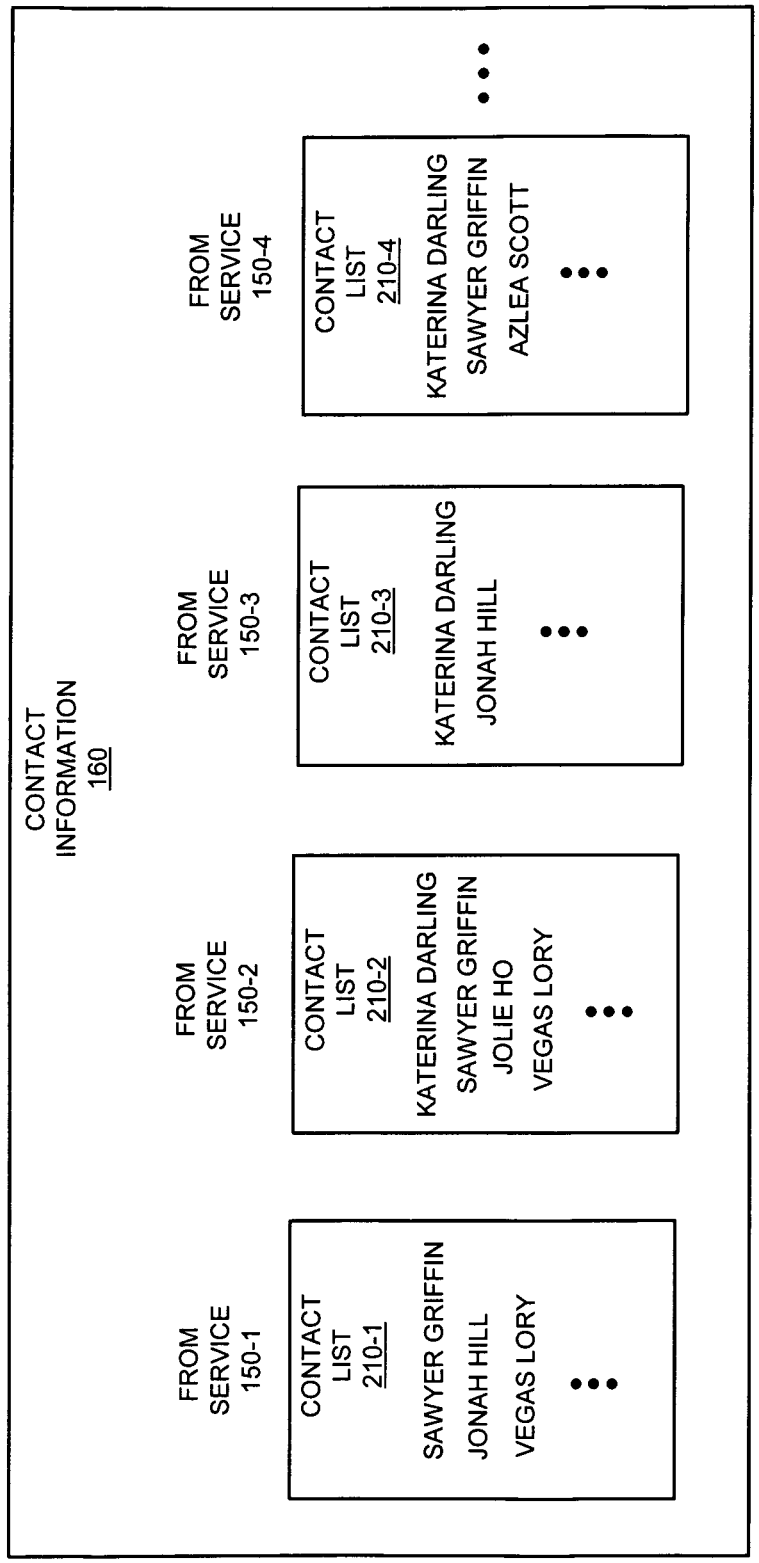
FIG. 2 is an example diagram of contact information including lists of contacts from multiple services according to embodiments herein.

As an example, FIG. 2 is an example diagram illustrating retrieved contact information 170 according to embodiments herein. The contact information 170 includes one or more contact lists 210 (e.g., contact list 210-1, contact list 210-2, contact list 210-3, and contact list 210-4) retrieved from services 150. Each of contact lists 210 represents a private collection of contact information associated with the user.

For instance, based on selection of service 150-1, the contact information manager 140 communicates with service 150-1 to retrieve contact list 210-1 from service 150-1. Based on selection of service 150-2, the contact information manager 140 communicates with service 150-2 to retrieve contact list 210-2 from service 150-2. Based on selection of service 150-3, the contact information manager 140 communicates with service 150-3 to retrieve contact list 210-3 from service 150-3. Based on selection of service 150-4, the contact information manager 140 communicates with service 150-4 to retrieve contact list 210-4 from service 150-4.

Recall that each of the contact lists 210 includes a listing of contacts associated with the user at computer system 120. That is, as illustrated in FIG. 2, contact list 210-1 indicates the user's contacts such as Sawyer Griffin, Jonah Hill, etc., that subscribe to service 150-1. Contact list 210-1 indicates the user's contacts Katerina Dalring, Jolie Ho, etc., that subscribe to service 150-2. Contact list 210-3 indicates the user's contacts Katerina Darling, Jonah Hill, etc., that subscribe to service 150-3. Contact list 210-4 indicates the user's contacts Katerina Darling, Sawyer Griffin, etc., that subscribe to service 150-4.

As shown, although not necessary, there may be some overlap with respect to names of contacts at different services 150. For example, a user's contact may subscribe to multiple different services 150. In certain cases, a contact associated with the user may subscribe to a single service.

In furtherance of executing the collection command initiated by the user at computer system 120 or based on the collection schedule as discussed above in which the contact information manager 140 is configured to automatically perform a scheduled collection on behalf of the user, the contact information manager 140 utilizes the names in the contact lists 210 to retrieve further contact information. For example, the contact information manager 140 communicates with service 150-1 to retrieve contact information associated with each of Sawyer Griffin, Jonah Hill, Vegas Lory, etc. The contact information manager 140 communicates with service 150-2 to retrieve contact information associated with each of Katerina Darling, Sawyer Griffin, Jolie Ho, Vegas Lory, etc. The contact information manager 140 communicates with service 150-3 to retrieve contact information associated with each of Katerina Darling, Jonah Hill, etc. The contact information manager 140 communicates with service 150-4 to retrieve contact information associated with each of Katerina Darling, Sawyer Griffin, Alzea Scott, etc.

As previously discussed, the contact information retrieved for each of the contacts in the contact lists 210 can specify different communication modes such as phone, e-mail, addresses information, whereabouts information, etc., for communicating with the user's contacts. In addition to the one or more communication modes for reaching different contacts, the contact information can specify particular information such as phone number sequence, e-mail address, etc., required to reach the respective contact via the corresponding communication mode.

Figure 3:
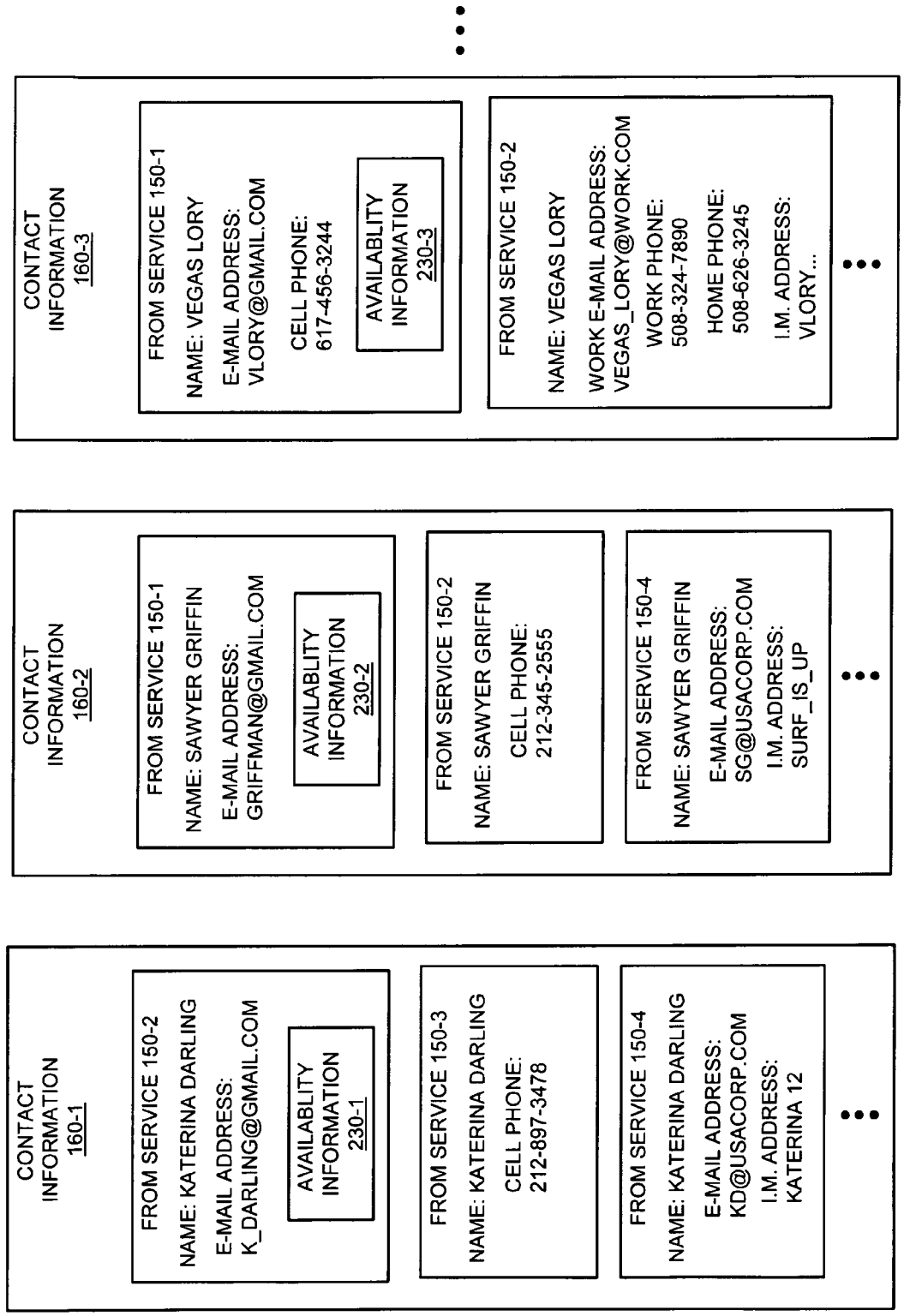
FIG. 3 is an example diagram of contact information retrieved from multiple services according to embodiments herein.

FIG. 3 is an example diagram illustrating collected contact information as processed according to embodiments herein. As shown, the contact information manager 140 processes the retrieved contact information 160 and sorts it based on a corresponding contact to which the information belongs. For example, the contact information manager 140 maintains the contact information 160-1 associated with Katerina Darling in a separate grouping than the contact information 160-2 associated with Sawyer Griffin. The contact information manager 140 maintains the contact information 160-2 associated with Sawyer Griffin in a separate grouping than the contact information 160-3 associated with Vegas Lory, and so on.

Note that certain of the services 150 may provide availability status information associated with a corresponding contact. For example, the availability status information can include information such as whether the contact is currently available, a schedule specifying availability of the contact, where the contact is currently located, etc. FIG. 3 illustrates example availability information 230-1 for Katerina Darling, availability information 230-2 for Sawyer, and availability information 230-3 for Vegas Lory, etc.

In one embodiment, upon retrieval of the contact information from the services 150, the contact information manager 140 determines if a conflict exists between contact information specifying how to reach a target contact. For example, the contact information from a first service may indicate a contact name of John Smith. The contact information from a second service may indicate a contact name of John M. Smith. Based on this information, the contact information manager 140 may query the user to reconcile whether this contact is the same contact or different contact.

In certain cases, it may not be necessary to prompt the user because the contact information manager 140 may be able to reconcile the information. For example, the contact information for John Smith as retrieved from a first service such as service 150-1 may indicate a corresponding phone number of 508-678-9876. By chance, the contact information for John Smith as retrieved from a second service such as service 150-2 also may indicate a corresponding phone number of 508-678-9876. Based on matching of information other than just a name of the contact, the contact information manager 140 can assume that this is the same contact (and consolidate it in the same grouping) because the phone number is the same even though the spelling of the contact name for John Smith as retrieved from different services do not exactly match each other.

As another example, the contact names retrieved from multiple services may match. However, the contact information manager 140 may process a corresponding phone number and identify that the phone number contact information provided by two different services are very close but do not match exactly. For example, a phone number for John Smith from service 150-1 may be similar but different to a phone number retrieved from service 150-2 for John Smith. In such an instance, the contact information manager 140 identifies a discrepancy and notifies the user to reconcile such as fix, modify, confirm correctness, etc., the contact information associated with the given contact. Accordingly, the contact information presented to the user can be more accurate than the raw contact information retrieved from the different services 150.

Figure 4:
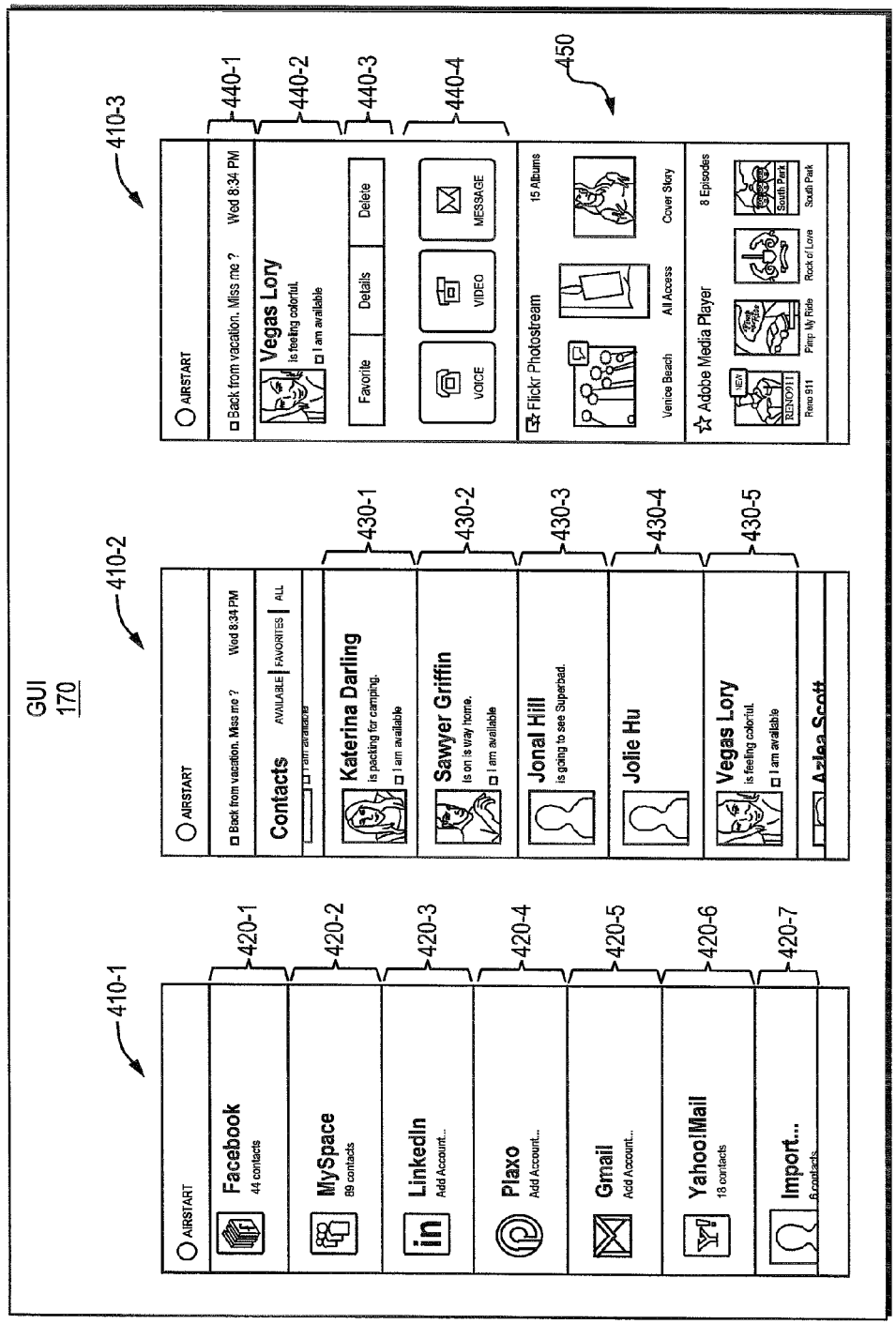
FIG. 4 is an example screenshot for managing and viewing contact information according to embodiments herein.

FIG. 4 is an example diagram illustrating a screenshot displaying services and contact information according to embodiments herein. In general, screenshot 400 enables a viewer to view and manage the contact information retrieved from multiple different services 150.

For example, column 410-1 displays a listing 103 of the different services 150 from which the user can make a selection. The listing 103 includes display region 420-1, display region 420-2, display region 420-3, display region 420-4, display region 420-5, display region 420-6, and display region 420-7.

More specifically, display region 420-1 displays an identity of service 150-1 (in this example, Facebook™). The contact information manager 140 can initiates display of a numerical value (44) to indicate how many contacts the corresponding user has with the service 150-1.

The contact information manager 140 initiates display of display region 420-2 to indicate the identity of service 150-2 (in this example, My Space™). The contact information manager 140 initiates display of a numerical value (89) to indicate that the user has 89 contacts at service 150-2.

In a similar manner, the contact information manager 140 displays a listing of the services in display region 420-6 and display region 420-7 to which the user subscribes.

In one embodiment, column 410-1 includes services to which the user may not yet subscribe. In such an embodiment, the user can select a corresponding display region to initiate a process to sign up for the services. For example, display region 420-3 presents a selectable link enabling the user to sign up for a corresponding service such as Linked In™. Display region 420-4 presents a selectable link enabling the user to sign up for a corresponding service such as Plaxo™. Display region 420-5 presents a selectable link enabling the user to sign up for a corresponding service such as Gmail™. Each of display regions 420-3, 420-4, 4420-5 can have an associated link such that selection of the respective display region results in opening of a browser to the corresponding webpage of the service so that the user can easily sign up for the service.

In one embodiment, in accordance with a user's selection of services, the contact information manager 140 initiates display of, such as through highlighting, marking, etc., the multiple services selected by the user. Accordingly, a user can identify from which services the contact information will be collected.

Column 410-2 displays the unified listing of contacts as created by the contact information manager 140 via use of the retrieved contact information from the multiple services. As previously discussed, the user specifies the different services 150 from which to retrieve contact information. In one embodiment, the user can make the selection of services by clicking on the display regions in column 410-1.

Based on the retrieved information for the services, the contact information manager 140 initiates display of the contacts in column 410-2. The listing is unified in a sense that the user can view contacts regardless of which service retrieved the corresponding contact information for the contact. For example, each of the contacts in column 410-2 were identified based on retrieval of contact information from one or more different services. Because the contact information manager 140 collects, processes and creates the listing in column 410-2, the user can efficiently manage contacts from different services without having to manually visit each of the services to view corresponding contact information.

In the context of the present example, display regions 430 include contact information for the corresponding contacts. For example, display region 430-1 includes a picture and a name of corresponding contact. Thus, embodiments herein include initiating display of a name in the listing of multiple contacts to identify a given contact.

When available, the contact information manager 140 initiates display of status information indicating, for example, whether the corresponding contact is currently available, whereabouts of the contact, future availability of the contact, etc. Certain services may have this information while others may not. Thus, embodiments herein include initiating display of status information associated with the given contact to identify a current availability status associated with the given contact as retrieved from the at least one social networking website.

Additionally, note that the contacts listed in column 410-2 may include a display of message information specifically directed to the user. The contact information manager 140 can obtain the message information from a corresponding service and contact with which the contact subscribes.

The aggregation and consolidation of contact information by the contact information manager 140 as described herein enables the user to more easily manage his or her contact information because the contact information manager 140 aggregates bits and pieces of contact information and displays it on display screen 130 in a unified view. Accordingly, the user can more easily keep track of different contacts without having to visit many different websites because the contact information manager 140 provides such functionality. In other words, as previously discussed, the contact information manager 140 visits the different services such as websites, repositories, etc., and, based on retrieved information, displays it to the user in a more useful manner.

The different contacts as displayed in column 410-2 can be selected by a respective user. For example, in response to detecting selection of a display region 430 in column 410-2, the contact information manager 140 displays a detailed view of a contact selected from the listing of contacts in column 410-2. More specifically, assume that the user selects display region 430-5. In response to such a selection, the contact information manager 140 initiates display of contact information associated with Vegas Lory in column 410-3.

As previously discussed, the contact information manager 140 can initiate display of display region 440-1 so that it includes messages generated by the corresponding contact to the user.

Display region 440-2 includes an image associated with the contact as well as name and availability status information. The image in display region 440-2 as well as those in column 410-2 can be part of the contact information retrieved from the respective services.

Display region 440-3 includes a number management functions for selection by a user. Clicking on "Favorite" causes the contact to be included in a particular preferred class. For example, the user can use the classification to display only favorites in column 410-2.

Clicking on "Delete" in display region 440-3 removes a contact from the favorites classification.

Figure 5:
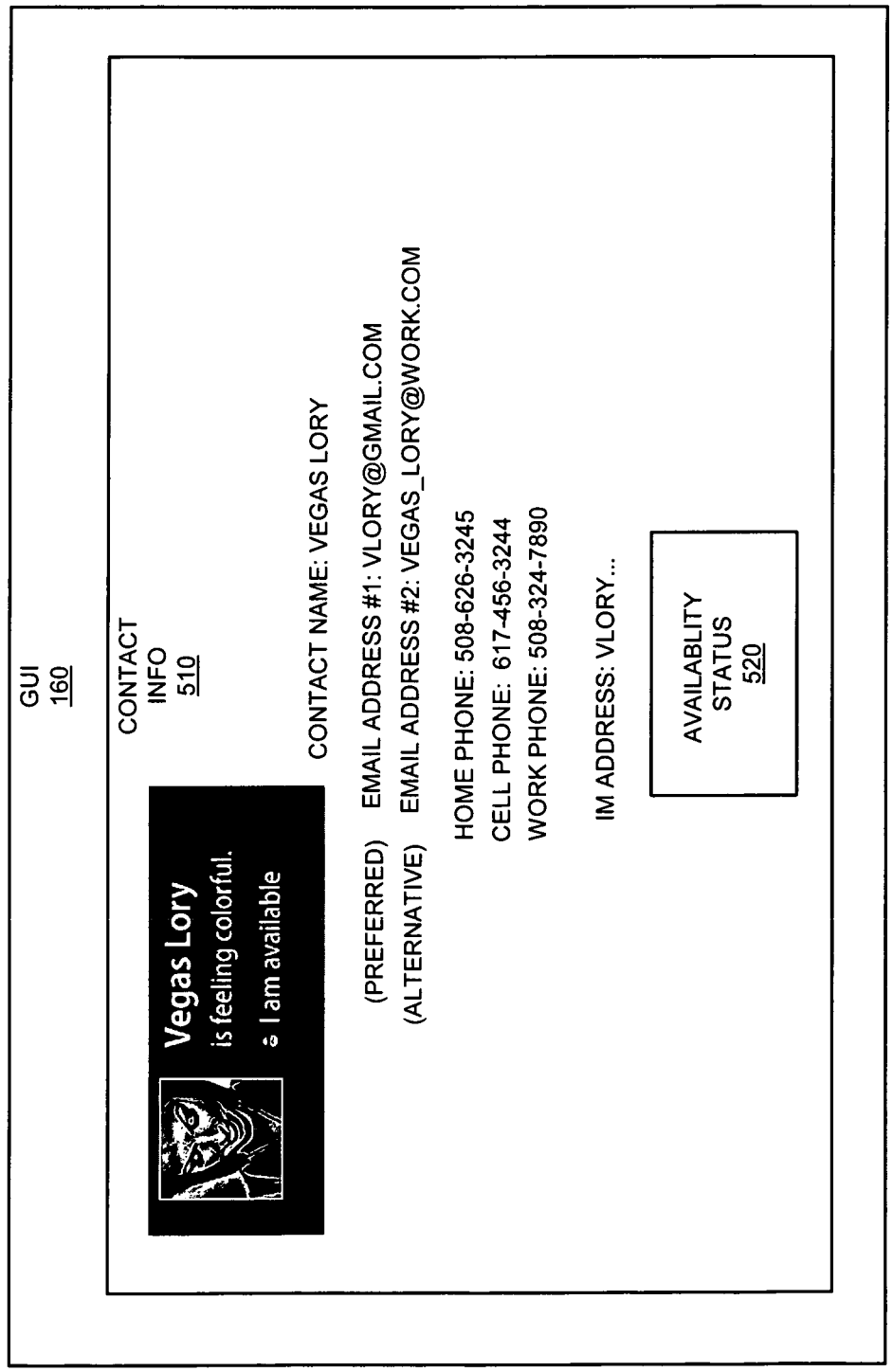
FIG. 5 is an example diagram of contact information for a particular contact as retrieved from multiple services according to embodiments herein.

Clicking on "Details" in display region 440-3 prompts the contact information manager 140 to display the contact information associated with the contact as shown in display region 440-2. For example, in response to such a selection, the contact information manager 140 initiates display of the contact information as shown in FIG. 5.

Continuing with the discussion of the screenshot 400 in FIG. 4, display region 440-4 enables the user to initiate different ways for communicating with the corresponding contact. For example, the user can click on the "voice" icon to initiate a call with the contact Vegas Lory. In response to such a selection, the contact information manager 140 would initiate a phone call to Vegas Lory in accordance with the contact information specifying how to reach her by phone.

In a similar manner, each of the "video" icon and "message" icon in display region 440-4 enables the user to contact Vegas Lory. For example, the user can click on the "video" icon to initiate a video conference call or video conference message with Vegas Lori in accordance with retrieved contact information specifying how to reach Vegas Lory via a video conference.

The user can click on the "message" icon in display region 440-4 to initiate creation of an e-mail to Vegas Lory in accordance with contact information such as a retrieved e-mail address specifying how to reach Vegas Lory via e-mail. In this last instance, the contact information manager 140 initiates display of a blank e-mail with an e-mail address associated with Vegas Lory.

Display region 450 includes favorite content associated with the corresponding contact as retrieved from the respective services 150.

FIG. 5 is an example diagram illustrating different contact information retrieved from multiple different services 150 according to embodiments herein. As shown, the contact information manager 140 initiates display of contact information 510 specifying different ways to reach Vegas Lory. Availability status 520 indicates her availability in accordance with the contact information retrieved for her from one or more services.

Recall that the contact information 510 associated with Vegas Lory includes the corresponding contact information as retrieved from multiple different services 150 as discussed above. Via graphical user interface 170, a respective user can view similar information from each of the different contact in column 410-2 (FIG. 4).

In one embodiment, the graphical user interface 170 is configured to detect selection of the different communicate modes for reaching Vegas Lory as displayed in contact information 510. For example, each of the different contact information can be a selectable display region, selection of which prompts the contact information manager 140 to initiate communication according to the selected communication mode.

More specifically, in response to selection of a displayed e-mail address, the contact information manager 140 populates a blank e-mail with the corresponding e-mail address so that the user can easily create an e-mail for sending to a corresponding contact, which in this example is Vegas Lory. In response to clicking on a phone number in contact information 510, the contact information manager 140 can initiate a corresponding call to Vegas Lory at the displayed number, and so on.

Figure 6:
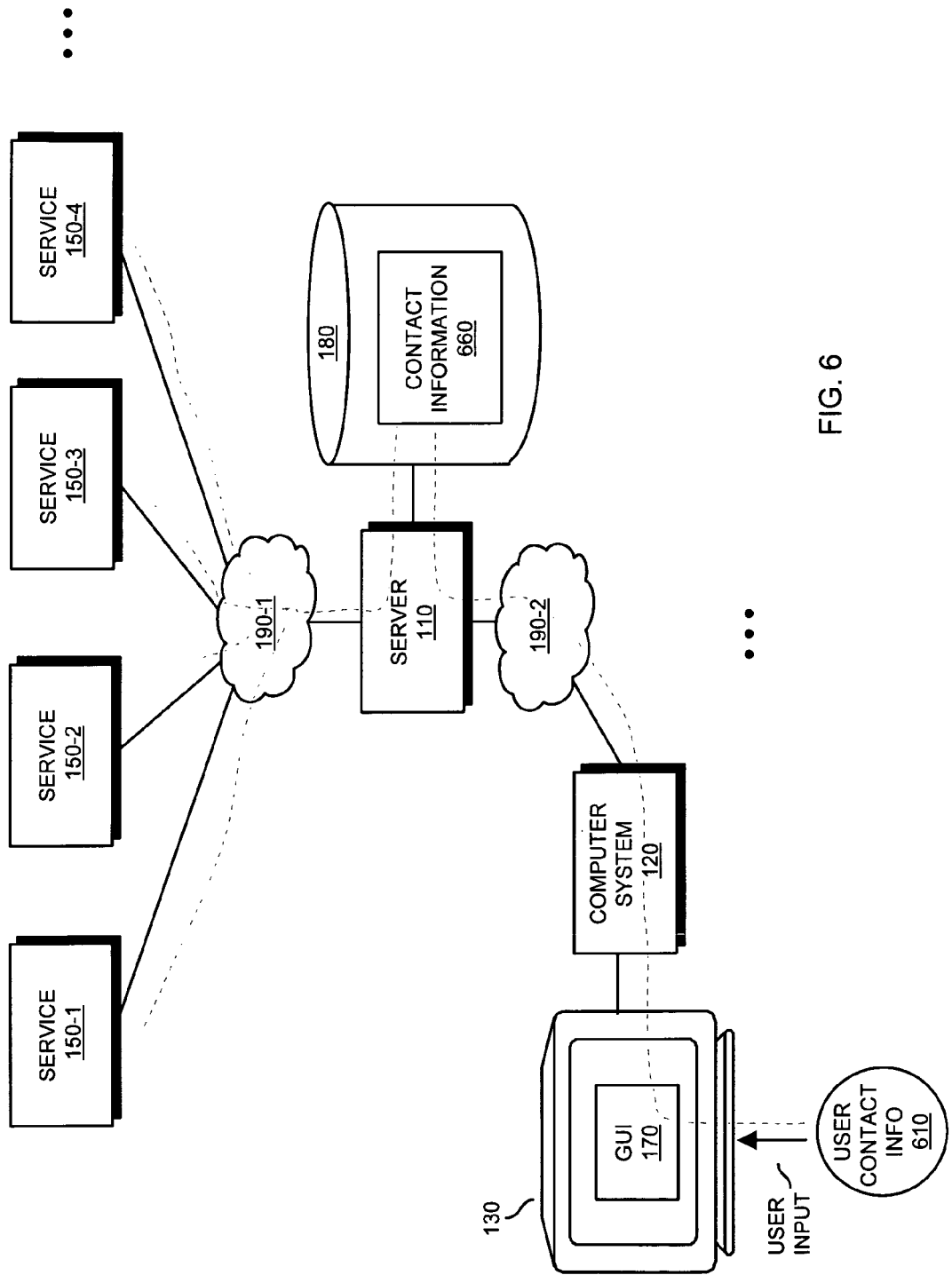
FIG. 6 is an example diagram illustrating collection and distribution of contact information according to embodiments herein.

FIG. 6 is an example diagram illustrating further management of contact information according to embodiments herein. As shown, the user can provide input via graphical user interface 170 and computer system 120 including updated contact information 660 associated with the user. The user forwards the information to contact information manager 140 in server 110. The user can specify which of multiple services 150 to which the updated contact information will be transmitted and used to update information associated with the user.

Use of the contact information manager 140 to distribute the user's updated contact information to the different services alleviates the user from having to visit each service and manually update the user's contact information. Thus, in addition to being an aggregator of contact information from multiple services 150, the contact information manager 140 can be used to distribute contact information as well.

As an alternative or in addition to providing updated contact information directly to graphical user interface 170 such as by a user typing in the new information, note that the user can manage or update the contact information associated with the user based on additional commands supported by the contact information manager 140. For example, the user can specify to the contact information manager 140 one or more services from which to retrieve contact information associated with the user. The user can issue a subsequent command to transmit the contact information retrieved by the contact information manager 140 to one or more services in order to update the contact information associated with the user.

More specifically, via graphical user interface 170, the contact information manager 140 can receive a command to retrieve contact information associated with the user from service 150-1 and forward that retrieved contact information to another service such as service 150-3. Based on a command to collect contact information associated with multiple services, the contact information manager 140 can retrieve contact information associated with the user from multiple services and forward such information to one or more other services as indicated by the user.

In a similar vein as mentioned above for collection of contact information, a "distribution of contact information" command may not be a direct command input by a user, but may be rather more of a passive, pre-set "scheduled" setting whereby the contact information manager 140 performs distribution of the user's updated contact information on a regular basis such as once a week, once a month, once a year, every so often, etc. Thus, in such embodiments, the services 150 can be updated with the most up-to-date contact information without the user having to repeatedly issue "distribution" commands.

By way of a non-limiting example, the user can configure the contact information manager 140 to automatically distribute the user's updated contact information to the services 150 on a scheduled basis. As an alternative non-limiting example, a source other than the user, such as a network administrator, policy, etc., can configure the contact information manager 140 to automatically perform distribution of the user's updated contact information to the services 150 on a scheduled basis.

Figure 7:
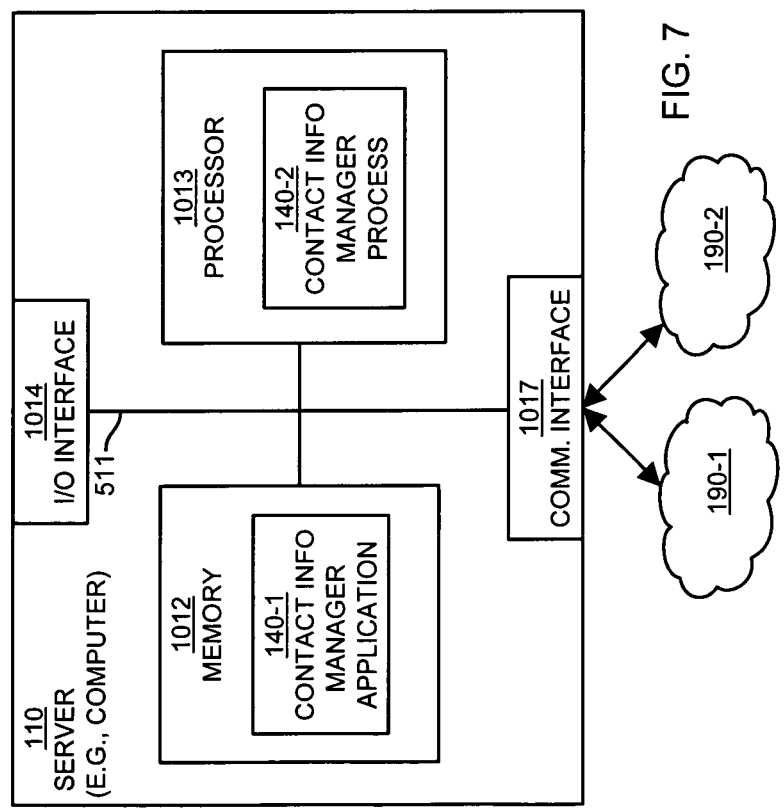
FIG. 7 is an example block diagram of a computer system configured with a processor and related storage to execute different methods according to embodiments herein.

FIG. 7 is a block diagram of an example architecture of a respective computer system 110 such as one or more computers, processes, etc., for implementing a contact information manager 140 according to embodiments herein. Computer system 110 can include computerized devices such as personal computers, servers that make up a website, workstations, portable computing devices, consoles, network terminals, networks, processing devices, etc.

Note that the following discussion provides a basic embodiment indicating how to carry out functionality associated with the contact information manager 140 as discussed above and below. However, it should be noted that the actual configuration for carrying out the contact information manager 140 can vary depending on a respective application. For example, as previously discussed, computer system 110 can include one or multiple computers that carry out the processing as described herein.

As shown, computer system 110 of the present example includes an interconnect 1011 that couples a memory system 1012, a processor 1013, I/O interface 1014, and a communications interface 1017.

I/O interface 1014 provides connectivity to peripheral devices such as repository 180 and other devices (if such devices are present) such as a keyboard, mouse such as a selection tool to move a cursor, display screen, etc.

Communications interface 1017 enables the contact information manager 140 of computer system 110 to communicate over network 190 (e.g., network 190-1 and network 190-2) and, if necessary, retrieve data required to create views, access contact information, communicate with a user, etc. according to embodiments herein.

As shown, memory system 1012 is encoded with contact information manager application 140-1 that supports functionality as discussed above and as discussed further below. Contact information manager application 140-1 (and/or other resources as described herein) can be embodied as software code such as data and/or logic instructions that supports processing functionality according to different embodiments described herein.

During operation of one embodiment, processor 1013 accesses memory system 1012 via the use of interconnect 1011 in order to launch, run, execute, interpret or otherwise perform the logic instructions of the contact information manager application 140-1. Execution of the contact information manager application 140-1 produces processing functionality in contact information manager process 140-2. In other words, the contact information manager process 140-2 represents one or more portions of the contact information manager 140 performing within or upon the processor 1013 in the computer system 110.

It should be noted that, in addition to the contact information manager process 140-2 that carries out method operations as discussed herein, other embodiments herein include the contact information manager application 140-1 itself (i.e., the un-executed or non-performing logic instructions and/or data). The contact information manager application 140-1 may be stored on a tangible computer readable medium or any other computer readable media such as floppy disk, hard disk, optical medium, etc. According to other embodiments, the contact information manager application 140-1 can also be stored in a memory type system such as in firmware, read only memory (ROM), or, as in this example, as executable code within the memory system 1012.

In addition to these embodiments, it should also be noted that other embodiments herein include the execution of the contact information manager application 140-1 in processor 1013 as the contact information manager process 140-2. Thus, those skilled in the art will understand that the computer system 110 can include other processes and/or software and hardware components, such as an operating system that controls allocation and use of hardware resources.

Functionality supported by computer system 110 and, more particularly, functionality associated with contact information manager 140 will now be discussed via flowcharts in FIGS. 8 through 11. For purposes of the following discussion, the contact information manager 140 or other appropriate entity performs steps in the flowcharts.

Figure 8:
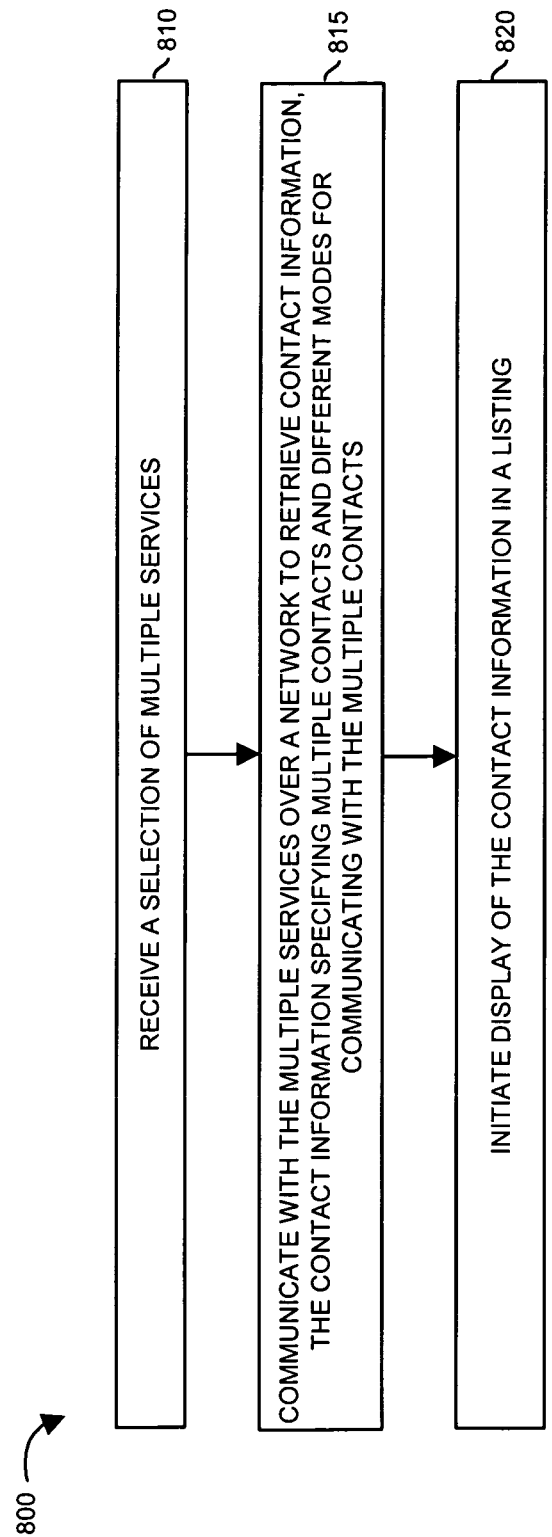
FIG. 8 is a flowchart illustrating an example of a method for managing contact information according to embodiments herein.

More particularly, FIG. 8 is an example flowchart 800 illustrating a operations associated with contact information manager according to embodiments herein. Note that flowchart 800 of FIG. 8 and corresponding text below may overlap with and refer to some of the matter previously discussed with respect to FIGS. 1-6. Also, note that the steps in the below flowcharts need not always be executed in the order shown.

In step 810, the contact information manager 140 receives a selection of multiple services through which each of multiple contacts manages their own respective contact information. In other words, each of the contacts accesses respective services to update his or her contact information at the respective service.

In step 815, the contact information manager 140 communicates with the multiple services over a network to retrieve contact information associated with the multiple contacts. According to one embodiment, the contact information received from the multiple services specifies identities of the multiple contacts and different modes for communicating with the multiple contacts.

In step 820, the contact information manager 140 initiates display of the contact information in a listing to indicate the different modes for communicating with the multiple contacts.

By way of a non-limiting example, the listing can be a unified listing such as that shown in column 410-2 of FIG. 4 on display screen 130.

Figure 9:
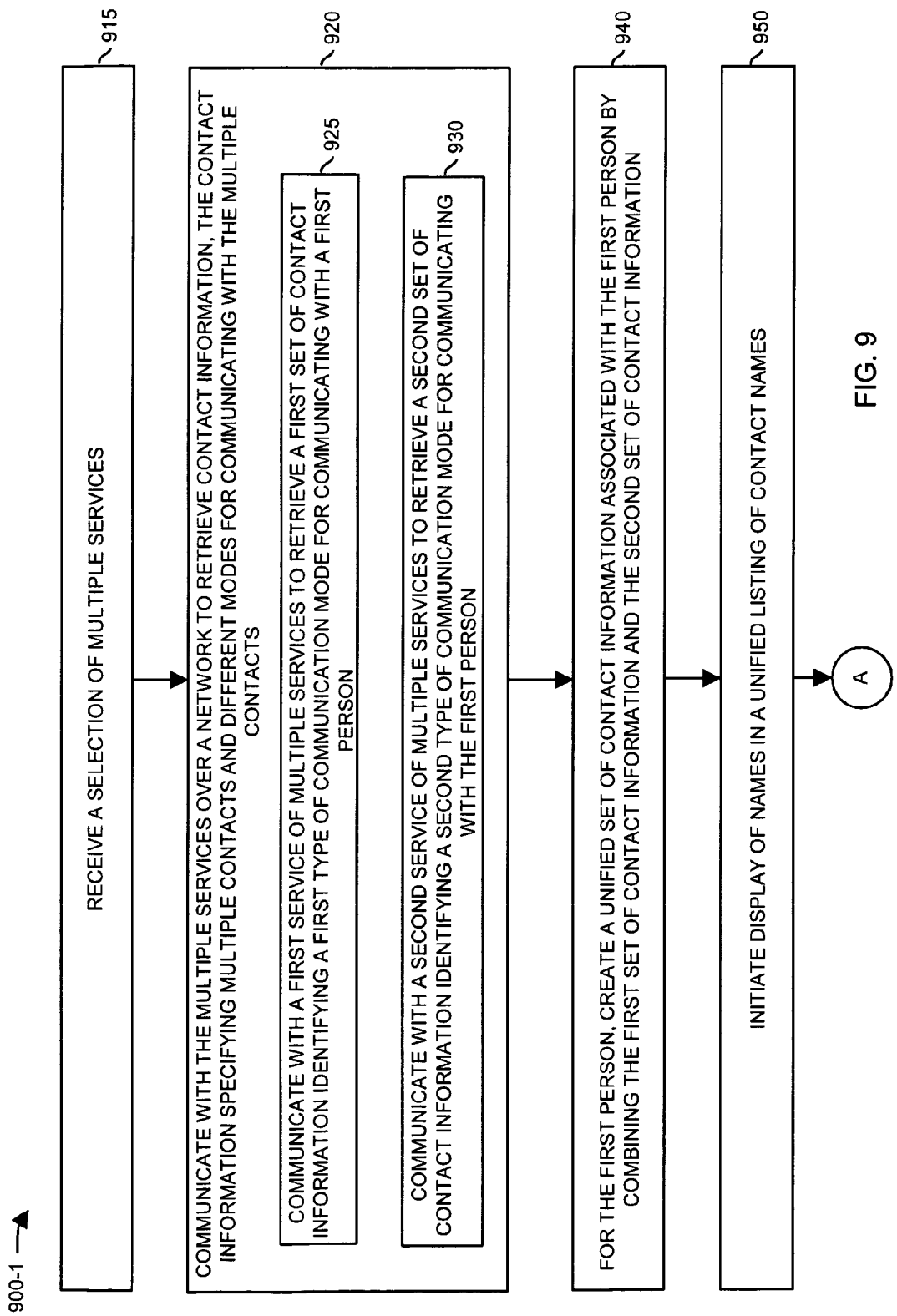
FIGS. 9 and 10 combine to form a flowchart illustrating an example of a method for managing contact information according to embodiments herein.
Figure 10:
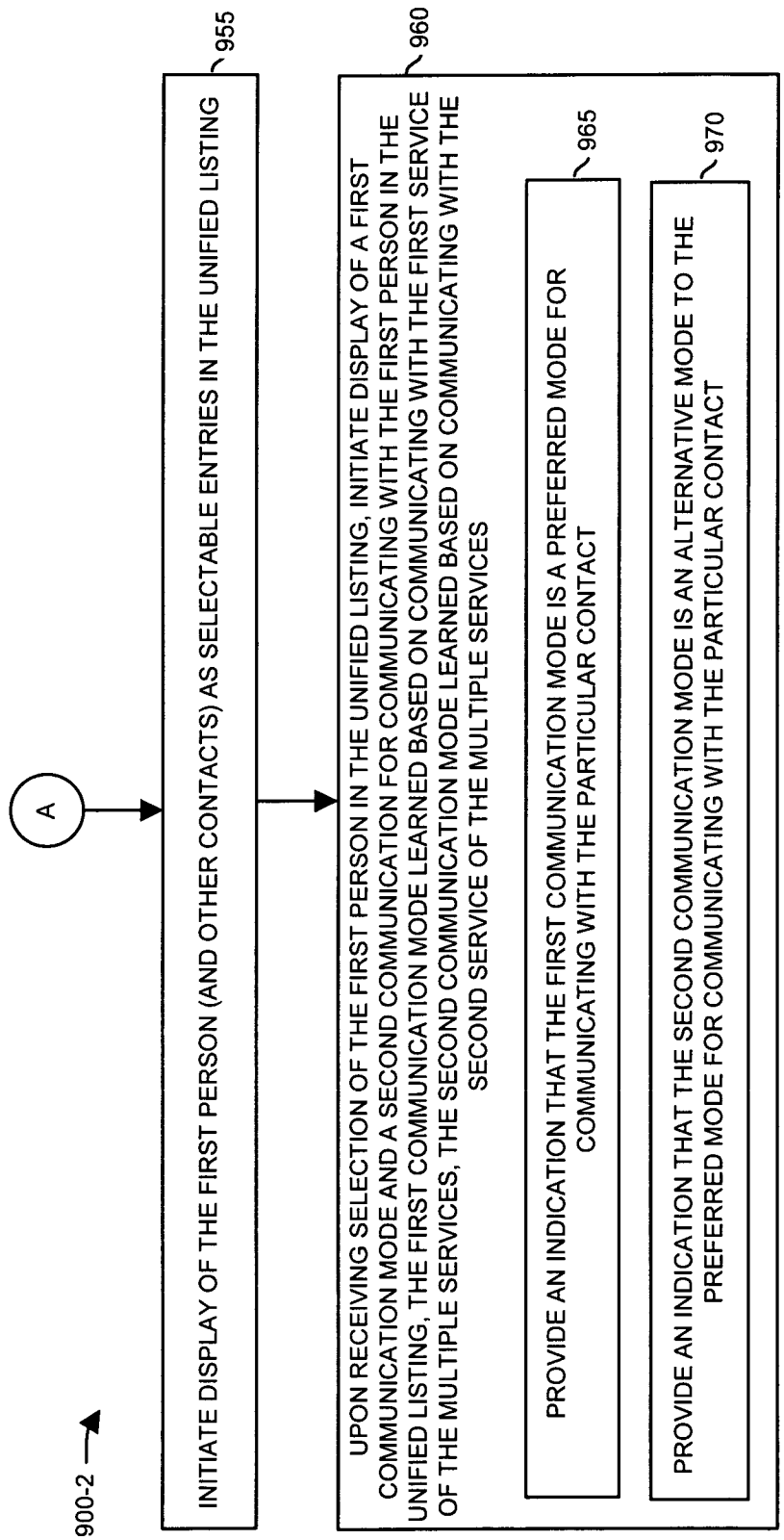

FIGS. 9 and 10 combine to form a flowchart illustrating an example of a method for managing contact information according to embodiments herein.

In step 915, the contact information manager 140 receives a selection of multiple services from which to retrieve contact information.

In step 920, the contact information manager 140 communicates with the multiple selected services over a network 190 to retrieve the contact information. In one embodiment, the contact information specifies multiple contacts and different modes for communicating with the multiple contacts.

In sub-step 925, the contact information manager 140 communicates with a first service of the selected services to retrieve a first set of contact information identifying a first type of communication mode for communicating with a first person.

In sub-step 930, the contact information manager 140 communicates with a second service of the selected services to retrieve a second set of contact information identifying a second type of communication mode for communicating with the first person.

In step 940, for the first person, the contact information 140 creates a unified set of contact information associated with the first person by combining the first set of contact information and the second set of contact information. An example of such information is displayed as contact information 510 in FIG. 5.

In step 950, the contact information manager 140 initiates display of contact names in a unified listing.

In step 955 of FIG. 10, the contact information manager 140 initiates display of the first person (and other contacts) as selectable entries in the unified listing.

In step 960, upon receiving selection of (in certain embodiments, by clicking on) the first person in the unified listing, the contact information manager 140 initiates display of different communicate modes for reaching the first person including a first communication mode and a second communication mode.

In sub-step 965, the contact information manager 140 provides an indication that the first communication mode is a preferred mode for communicating with the particular contact such as a first person.

In sub-step 970, the contact information manager 140 provides an indication that the second communication mode is an alternative mode to the preferred mode for communicating with the particular contact such as the first person.

Figure 11:
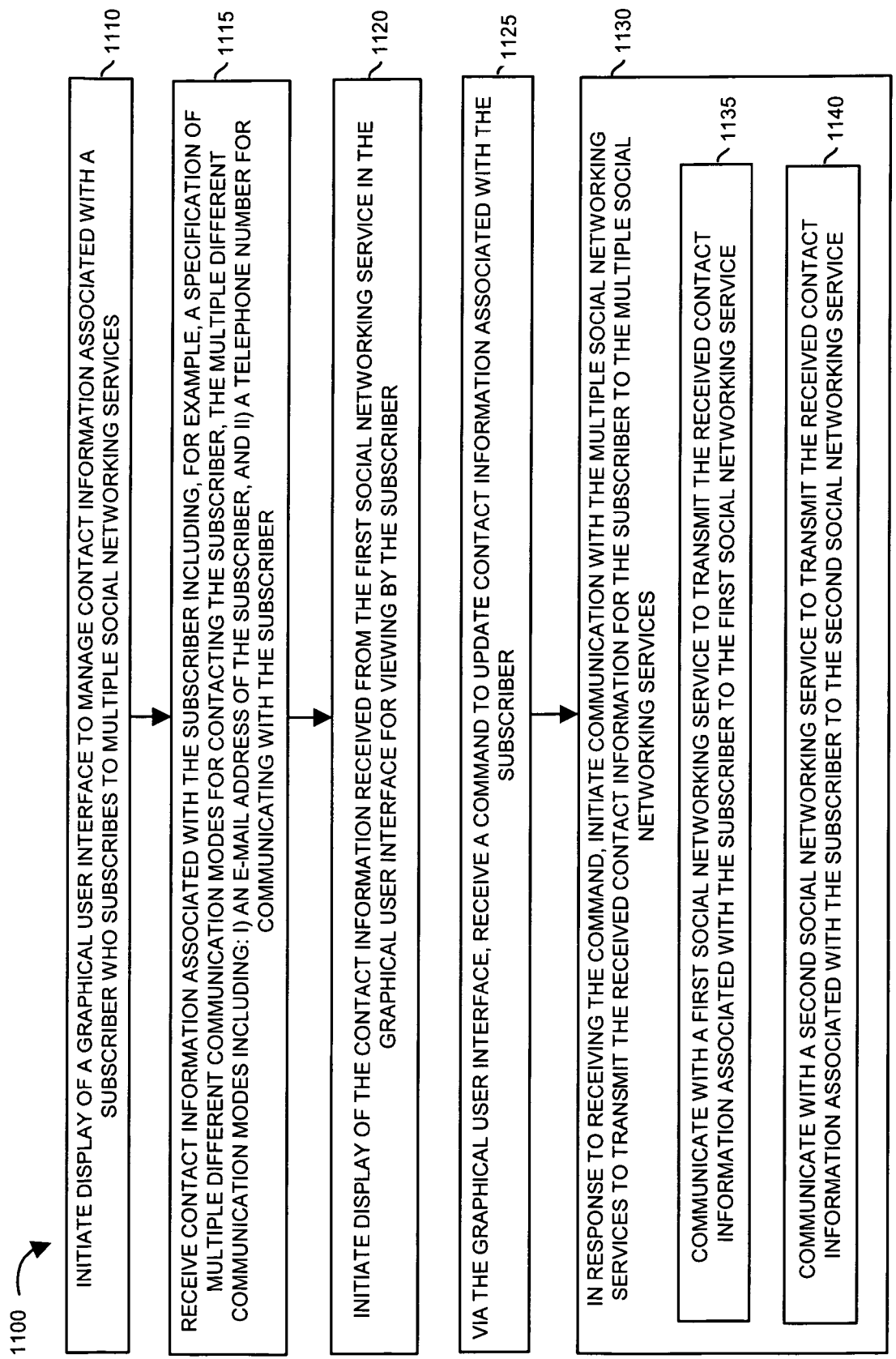
FIG. 11 is a flowchart illustrating an example of a method for distributing contact information according to embodiments herein.

FIG. 11 is a flowchart illustrating an example of a method for distributing contact information according to embodiments herein.

In step 1110, the contact information manager 140 initiates display of a graphical user interface 170 to manage contact information associated with a subscriber such as a user of computer system 120) who subscribes to multiple services 150. As mentioned above, by way of a non-limiting example, one or more of the services 150 can be social networking services to which the user subscribes.

In step 1115, the contact information manager 140 receives contact information associated with the subscriber including, for example, a specification of multiple different communication modes for contacting the subscriber. The contact information can be supplied in a number of different ways such as from other services 150 and/or directly from information provided to the contact information manager 140 via graphical user interface 170. As previously discussed, the multiple different communication modes can include information such as: i) an e-mail address of the subscriber, ii) a telephone number for communicating with the subscriber, etc.

In step 1120, the contact information manager 140 initiates display of the contact information, such as information received from a first social networking service, in the graphical user interface for viewing by the subscriber.

In step 1125, via the graphical user interface 170 and input from a user, the contact information manager 140 receives a command to update contact information associated with the subscriber. As previously discussed, the command to update the contact information associated with the user can be issued based on a schedule function that issues the distribution command.

In step 1130, in response to receiving the command regardless of which type of entity issues the command, the contact information manager 140 initiates communication with one or more multiple social networking services to transmit the received contact information for the subscriber to the one or more multiple social networking services.

In sub-step 1135, the contact information manager 140 transmits the received contact information associated with the subscriber to the first social networking service.

In sub-step 1140, the contact information manager 140 transmits the received contact information associated with the subscriber to the second social networking service. Accordingly, the contact information manager 140 can support distribution of contact information either in response to a direct command by the user to distribute the user's updated contact information to one or more services 150 or in response a schedule indicating to automatically distribute the user's updated contact information to the one or more services 150.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
receiving a selection of multiple communication service providers through which each of multiple contacts manages their own respective contact information;
communicating with the multiple communication service providers over a network to retrieve contact information associated with the multiple contacts, the contact information received from the multiple communication service providers specifying identities of the multiple contacts and different modes for communicating with the multiple contacts; and
initiating display of the contact information sorted in a listing by the respective identities of the multiple contacts to indicate the different modes for communicating with the multiple contacts.

2. The method as in claim 1, wherein initiating display of the contact information includes initiating display of at least a portion of the multiple contacts in the listing, the method further comprising:
upon receiving selection of a contact displayed in the listing, initiating display of a first communication mode and a second communication mode for communicating with the selected contact, the first communication mode learned based on communicating with a first service of the multiple services, the second communication mode learned based on communicating with a second service of the multiple services.

3. The method of claim 2 further comprising:
for the selected contact in the listing: i) providing an indication that the first communication mode is a preferred mode for communicating with the particular contact, and ii) providing an indication that the second communication mode is an alternative mode to the preferred mode for communicating with the particular contact.

4. The method as in claim 2, wherein receiving the selection includes receiving an identity of a social network website accessed by a given user, the social network website maintaining a private collection of contacts associated with the given user;
wherein communicating with the multiple services to retrieve the contact information includes: i) communicating with the social network website to retrieve the private collection of contacts associated with the user, identity information in the private collection of contacts specifying multiple different contacts affiliated with the social network website, and ii) for each contact in the private collection of contacts, initiating retrieval of contact data from the social networking website; and wherein initiating display of the contact information in the listing includes initiating display of at least one contact retrieved from the private collection.

5. The method as in claim 1, wherein communicating with the multiple services over the network further comprises:

communicating with a first service of the multiple services to retrieve first contact information supporting a first communication mode; and communicating with a second service of the multiple services to retrieve second contact information supporting a second communication mode.

6. The method as in claim 5, wherein initiating display of the retrieved contact information in the listing further comprises:

initiating display of an identity of a first person as specified by the first contact information retrieved from the first service, the first person reachable via the first communication mode; and initiating display of an identity of a second person as specified by the second contact information retrieved from the second service, the second person reachable via the second communication mode.

7. The method of claim 1, wherein communicating with the multiple services over the network further comprises:

communicating with a first service of multiple services to retrieve a first set of contact information identifying a first type of communication mode for communicating with a first person, the first set of contact information managed by the first person via communications between the first person and the first service; and communicating with a second service of multiple services to retrieve a second set of contact information identifying a second type of communication mode for communicating with the first person, the second set of contact information managed by the first person via communications between the first person and the second service.

8. The method of claim 7 further comprising:

creating a unified set of contact information associated with the first person by combining the first set of contact information and the second set of contact information;

initiating display of a selectable display region associated with the first person in the listing; and in response to receiving input with respect to the selectable display region, initiating display of the unified set of contact information.

9. The method of claim 1, wherein communicating with the multiple services over the network includes retrieving a first set of contact information from a first service and retrieving a second set of contact information from a second service, the method further comprising:

determining if a conflict exists between contact information specifying how to reach a target contact via a given communication mode as specified in the first set of contact information versus the second set of contact information; and upon determining that the conflict exists, notifying a user to reconcile contact information associated with the target contact.

10. The method of claim 1 further comprising:

initiating display of names associated with the multiple services to provide notification of the multiple services from which the contact information can be collected for a user, the displayed names including a first social network website and a second social network website utilized by the user to obtain information associated with the multiple contacts.

11. The method of claim 1, wherein initiating display of the retrieved contact information in the listing further comprises initiating display of names associated with the multiple contacts as identified by the contact information retrieved from the multiple services.

12. The method of claim 1 further comprising:

for a given contact of the multiple contacts, initiating display of multiple possible communication modes for communicating with the given contact, the display of multiple possible communication modes being sorted by a name of each of the multiple contacts, a first communication mode of the displayed communication modes for the given contact derived from contact information retrieved from a first service of the multiple services, a second communication mode of the displayed communication modes of the given contact derived from contact information retrieved from a second service of the multiple services.

13. The method of claim 1, wherein communicating with the multiple services over the network includes communicating with at least one social networking website; and wherein initiating display of the contact information in the listing includes: i) initiating display of a name in the listing to identify a given contact in the listing of the multiple contacts, and ii) initiating display of information associated with the given contact regarding communication status of the given contact.

14. The method as in claim 1, wherein communicating with the multiple services includes:

initiating communications with the multiple services as specified by a schedule to perform multiple successive scheduled collections of the contact information from the multiple services at different times.

15. A method comprising:

initiating display of a graphical user interface to manage, by a subscriber who subscribes to multiple social networking services, contact information associated with the subscriber;

receiving contact information associated with the subscriber;

via the graphical user interface, receiving a command to update contact information associated with the subscriber; and in response to receiving the command, initiating communication with the multiple social network services to transmit the received contact information for the subscriber to the multiple social networking services.

16. The method as in claim 15, wherein receiving the contact information includes receiving contact information associated with the subscriber from a first social networking service, the received contact information provided to the first social networking service based on communications between the subscriber and the first social networking service; and wherein initiating communication with the multiple social networking services includes: transmitting at least a portion of the contact information received from the first social networking service to the multiple social networking services to update the contact information of the subscriber at the multiple social networking services.

17. The method as in claim 16 further comprising:
prior to receiving the command, initiating display of the contact information received from the first social networking service in the graphical user interface for viewing by the subscriber.

18. The method as in claim 16, wherein receiving the contact information associated with the subscriber includes receiving a specification of multiple different communication modes for contacting the subscriber.

19. The method as in claim 15, wherein initiating communication with the multiple social networking services includes:
communicating with a first social networking service to transmit the received contact information associated with the subscriber to the first social networking service; and
communicating with a second social networking service to transmit the received contact information associated with the subscriber to the second social networking service.

20. A non-transitory computer readable medium having computer code thereon, the medium comprising:
instructions for receiving a selection of multiple services through which each of multiple contacts manages their own respective contact information;
instructions for communicating with the multiple services over a network to retrieve contact information associated with the multiple contacts, the contact information received from the multiple services specifying identities of the multiple contacts and different modes for communicating with the multiple contacts; and
instructions for initiating display of the contact information in a listing to indicate the different modes for communicating with the multiple contacts.

21. The computer readable medium as in claim 20, wherein the instructions for initiating display of the contact information includes instructions for initiating display of at least a portion of the multiple contacts in the listing, the computer readable medium further comprising:
instructions for initiating display of a first communication mode and a second communication for communicating with the selected contact upon receiving selection of a contact displayed in the listing, the first communication mode learned based on communicating with a first service of the multiple services, the second communication mode learned based on communicating with a second service of the multiple services.

22. The computer readable medium as in claim 20, wherein the instructions for communicating with the multiple services over the network includes:
instructions for communicating with a first service of the multiple services to retrieve first contact information supporting a first communication mode; and
instructions for communicating with a second service of the multiple services to retrieve second contact information supporting a second communication mode.

23. The computer readable medium as in claim 22, wherein the instructions for initiating display of the retrieved contact information in the listing includes:
instructions for initiating display of an identity of a first person as specified by the first contact information retrieved from the first service, the first person reachable via the first communication mode; and
instructions for initiating display of an identity of a second person as specified by the second contact information retrieved from the second service, the second person reachable via the second communication mode.

24. The computer readable medium as in claim 20, wherein the instructions for communicating with the multiple services over the network includes:
instructions for communicating with a first service of multiple services to retrieve a first set of contact information identifying a first type of communication mode for communicating with a first person; and
instructions for communicating with a second service of multiple services to retrieve a second set of contact information identifying a second type of communication mode for communicating with the first person.

25. The computer readable medium as in claim 24 further comprising:
instructions for creating a unified set of contact information associated with the first person by combining the first set of contact information and the second set of contact information;
instructions for initiating display of a selectable display region associated with the first person in the listing; and
instructions for initiating display of the unified set of contact information in response to receiving input with respect to the selectable display region.

26. The computer readable medium as in claim 20 further comprising:
for a given contact of the multiple contacts, instructions for initiating display of multiple possible communication modes for communicating with the given contact, a first communication mode of the displayed communication modes for the given contact derived from contact information retrieved from a first service of the multiple services, a second communication mode of the displayed communication modes of the given contact derived from contact information retrieved from a second service of the multiple services.

27. The computer readable medium as in claim 20, wherein the instructions for communicating with the multiple services over the network includes instructions for communicating with at least one social networking website; and
wherein the instructions for initiating display of the contact information in the listing includes: i) instructions for initiating display of a name in the listing to identify a given contact in the listing of the multiple contacts, and ii) instructions for initiating display of status information associated with the given contact to identify a current availability status associated with the given contact as retrieved from the at least one social networking website.

28. The computer readable medium as in claim 20, wherein the instructions for communicating with the multiple services over the network includes instructions for initiating communications with the multiple services in accordance with a schedule to perform multiple scheduled collections of the contact information from the multiple services at different times.

29. A computer system comprising:
a processor;
a memory unit that stores instructions associated with an application executed by the processor; and
an interconnect coupling the processor and the memory unit, enabling the computer system to execute the application and perform operations of:
receiving a selection of multiple services through which each of multiple contacts manages their own respective contact information;
communicating with the multiple services over a network to retrieve contact information associated with the multiple contacts, the contact information received from the multiple services specifying identities of the multiple contacts and different modes for communicating with the multiple contacts; and initiating display of the contact information in a listing to indicate the different modes for communicating with the multiple contacts.

* * * * *